(12) United States Patent
Drube

(10) Patent No.: US 9,551,330 B2
(45) Date of Patent: Jan. 24, 2017

(54) FRANGIBLE CLOSURE COUPLING FOR LIQUID NATURAL GAS TANK

(71) Applicant: Chart Inc., Ball Ground, GA (US)

(72) Inventor: Tom Drube, Garfield Heights, OH (US)

(73) Assignee: Chart Inc., Ball Ground, GA (US)

( * ) Notice: Subject to any disclaimer, the term of this patent is extended or adjusted under 35 U.S.C. 154(b) by 0 days.

(21) Appl. No.: 14/553,933

(22) Filed: Nov. 25, 2014

(65) Prior Publication Data

US 2015/0144203 A1 May 28, 2015

Related U.S. Application Data

(60) Provisional application No. 61/909,567, filed on Nov. 27, 2013, provisional application No. 61/909,884, filed on Nov. 27, 2013, provisional application No. 61/908,594, filed on Nov. 25, 2013, provisional application No. 61/908,632, filed on Nov. 25, 2013, provisional application No. 61/908,648, filed on Nov. 25, 2013, provisional application No. 61/908,659, filed on Nov. 25, 2013.

(51) Int. Cl.

| F16K 17/14 | (2006.01) |
|---|---|
| F04B 15/08 | (2006.01) |
| F17C 7/02 | (2006.01) |
| F17C 13/04 | (2006.01) |
| B61C 17/02 | (2006.01) |
| F16L 55/10 | (2006.01) |
| F17C 13/06 | (2006.01) |
| F17C 3/00 | (2006.01) |

(52) U.S. Cl.
CPC ............... *F04B 15/08* (2013.01); *B61C 17/02* (2013.01); *F16L 55/1007* (2013.01); *F17C 3/00* (2013.01); *F17C 7/02* (2013.01); *F17C 13/04* (2013.01); *F17C 13/06* (2013.01); *F04B 2015/081* (2013.01); *F17C 2201/035* (2013.01); *F17C 2201/054* (2013.01); *F17C 2203/0391* (2013.01); *F17C 2203/0629* (2013.01); *F17C 2205/0379* (2013.01); *F17C 2221/033* (2013.01); *F17C 2223/0161* (2013.01); *F17C 2227/0135* (2013.01); *F17C 2227/0178* (2013.01); *F17C 2270/0173* (2013.01); *Y10T 137/1624* (2015.04)

(58) Field of Classification Search
CPC ....... F04B 15/08; F04B 2015/081; F17C 7/02; F17C 13/04; F17C 13/06; B61C 17/02; F16L 55/1007; Y10T 137/1654; Y10T 137/2617; Y10T 137/2622
USPC .............................. 137/68.14, 115.18, 115.16
See application file for complete search history.

(56) References Cited

U.S. PATENT DOCUMENTS

| 2,423,436 A | 7/1947 | Blom |
| 2,430,956 A | 11/1947 | Scott |
| 3,369,715 A | 2/1968 | Carter |

(Continued)

FOREIGN PATENT DOCUMENTS

| CA | 2762697 A1 | 6/2013 |
| EP | 0208035 A1 | 1/1987 |

*Primary Examiner* — Kevin Murphy
*Assistant Examiner* — Minh Le
(74) *Attorney, Agent, or Firm* — Fred C. Hernandez; Mintz Levin Cohn Ferris Glovsky and Popeo, P.C.

(57) ABSTRACT

A frangible closure coupling is used with or on pipe of a tank that contains a potentially dangerous fluid, such as liquid natural gas. The closure coupling mitigates the uncontrolled release of fluid from the tank in the event of a rupture of a pipe attached to the tank.

10 Claims, 6 Drawing Sheets

(56) References Cited

U.S. PATENT DOCUMENTS

| | | | |
|---|---|---|---|
| 3,876,120 A | 4/1975 | Haesloop et al. | |
| 4,119,111 A * | 10/1978 | Allread | F16L 29/007 137/67 |
| 4,258,738 A * | 3/1981 | Redman | B64D 37/005 137/68.14 |
| 4,323,094 A * | 4/1982 | Paulis | B64D 37/16 137/614.03 |
| 4,361,165 A * | 11/1982 | Flory | F16K 17/40 137/614.02 |
| 4,494,945 A * | 1/1985 | Ogino | F16G 13/06 474/202 |
| 4,565,176 A * | 1/1986 | Alf | F02M 31/07 123/552 |
| 4,625,746 A * | 12/1986 | Calvin | F16K 17/40 137/556.3 |
| 4,667,994 A | 5/1987 | Foshee | |
| 4,860,545 A | 8/1989 | Zwick et al. | |
| 4,886,087 A * | 12/1989 | Kitchen | F16L 41/10 137/614.04 |
| 5,193,569 A * | 3/1993 | Moore | B67D 7/3218 137/493.3 |
| 5,208,979 A * | 5/1993 | Schmidt | B23D 31/003 225/2 |
| 5,546,975 A * | 8/1996 | Pernet | F02B 29/00 123/563 |
| 5,738,304 A * | 4/1998 | Tavano | B64D 37/32 137/67 |
| 5,765,587 A * | 6/1998 | Osborne | B67D 7/3209 137/68.12 |
| 5,921,266 A * | 7/1999 | Meyer | B67D 7/3209 137/487.5 |
| 5,941,268 A * | 8/1999 | Ross, Jr. | F17C 13/04 137/68.14 |
| 6,631,615 B2 | 10/2003 | Drube et al. | |
| 6,789,561 B2 * | 9/2004 | Osborne | F16K 17/34 137/460 |
| 6,802,332 B1 * | 10/2004 | Stuart | B67D 7/3218 137/493.3 |
| 6,898,940 B2 | 5/2005 | Gram et al. | |
| 7,543,653 B2 * | 6/2009 | Reilly | A62C 35/68 137/556 |
| 8,453,688 B2 * | 6/2013 | Allidieres | F17C 5/007 137/487 |
| 8,459,241 B2 | 6/2013 | Dixon et al. | |
| 8,499,549 B2 * | 8/2013 | Herges | F01N 1/165 123/323 |
| 8,991,415 B1 * | 3/2015 | Luppino | E03B 9/04 137/272 |
| 2005/0061366 A1 * | 3/2005 | Rademacher | B60P 3/2245 137/68.14 |
| 2005/0224114 A1 * | 10/2005 | Cook | F16K 15/033 137/68.14 |
| 2006/0027262 A1 * | 2/2006 | Rademacher | B60P 3/2245 137/68.14 |
| 2006/0120904 A1 | 6/2006 | Haesloop | |
| 2008/0196766 A1 * | 8/2008 | Gandy | F16K 17/403 137/68.14 |
| 2011/0005222 A1 | 1/2011 | Hayashi et al. | |
| 2011/0314839 A1 | 12/2011 | Brook et al. | |
| 2012/0216919 A1 | 8/2012 | Nylund | |
| 2013/0199616 A1 | 8/2013 | Van Tassel | |

\* cited by examiner

FRANGIBLE CLOSURE COUPLING FOR LIQUID NATURAL GAS TANK

REFERENCE TO PRIORITY DOCUMENT

This application claims priority to U.S. Provisional Patent Application Ser. No. 61/908,648 filed on Nov. 25, 2013. Priority to the aforementioned filing date is claimed and the provisional patent application is incorporated herein by reference.

The following U.S. Provisional Patent Applications are incorporated herein by reference: (1) U.S. Provisional Patent Application Ser. No. 61/908,659 entitled "Multimode Gas Delivery for Rail Tender" and filed on Nov. 25, 2013; (2) U.S. Provisional Patent Application Ser. No. 61/908,632 entitled "Pump Column Baffle for LNG Pump" and filed on Nov. 25, 2013; (3) U.S. Provisional Patent Application Ser. No. 61/908,648 entitled "SUMBERSIBLE PUMP BAFFLE FOR IN TANK PUMP" filed on Nov. 25, 2013; (4) U.S. Provisional Patent Application Ser. No. 61/908,594 entitled "SUMBERSIBLE PUMP BAFFLE FOR IN TANK PUMP" and filed on Nov. 25, 2013; (5) U.S. Provisional Patent Application Ser. No. 61/909,567 entitled "BOTTOM ACCESS IN TANK PUMP SUMP" and filed on Nov. 27, 2013; and (6) U.S. Provisional Patent Application Ser. No. 61/909,884 entitled "PUMP POSITIONING SCHEME FOR LNG RAIL TENDER" and filed on Nov. 27, 2013.

BACKGROUND

A tender car (or "rail tender") is a special rail vehicle hauled by a rail locomotive. The tender car contains the locomotive's fuel. Some rail vehicles are fueled by liquid natural gas (LNG), which means that the tender car is an LNG tender car, which typically includes a pump that is submersed within LNG in a tank. The submerged pump is configured to pump the LNG to the rail locomotive for power.

LNG rail tenders are relatively uncommon and the rail regulatory agencies still have not developed a set of regulations specifically for LNG rail tenders. A legitimate concern is the safety of the rail tender in the event of a rail accident such as derailment. In such an accident, the pipe that is coupled to the LNG tank may rupture, fracture, or rip from the tank, which might lead to release of LNG and subsequent jet or pool fires. This would obviously be undesirable and dangerous.

SUMMARY

In view of the foregoing, there is a need for devices and methods that mitigate the uncontrolled release of LNG from an LNG tank in the event of a pipe damage such a rupture.

Disclosed is a frangible closure coupling that may be used with or on pipe of a tank that contains a potentially dangerous fluid, such as LNG. The closure coupling mitigates the uncontrolled release of fluid from the tank in the event of a rupture of a pipe attached to the tank. In this regard, a frangible pipe closure coupling is configured to shut down or close off fluid release from the tank through the pipe in the event of a catastrophic accident that fractures or ruptures the pipe attached to the tank. In an embodiment, the storage tank is part of a tender rail car and that storage tank contains LNG although this embodiment is just an example.

In one aspect, there is disclosed fluid flow closure device for a liquid natural gas tank, comprising: a fluid conduit attachable to an outlet nozzle of a liquid natural gas tank, the fluid conduit having a breakable region that is inclined to break upon application of a predetermined amount of force to the fluid conduit; and a valve assembly inside the fluid conduit, wherein the valve assembly is in an open state that permits fluid flow in a distal direction when the breakable region of the fluid conduit is unbroken, and wherein the valve assembly automatically transitions to a closed state that inhibits fluid flow in a distal direction through the fluid conduit when the breakable region of the fluid conduit breaks.

The details of one or more variations of the subject matter described herein are set forth in the accompanying drawings and the description below. Other features and advantages of the subject matter described herein will be apparent from the description and drawings, and from the claims.

DETAILED DESCRIPTION

Before the present subject matter is further described, it is to be understood that this subject matter described herein is not limited to particular embodiments described, as such may of course vary. It is also to be understood that the terminology used herein is for the purpose of describing a particular embodiment or embodiments only, and is not intended to be limiting. Unless defined otherwise, all technical terms used herein have the same meaning as commonly understood by one skilled in the art to which this subject matter belongs.

Disclosed is a frangible closure coupling mechanism that may be used with or on pipe of an LNG tank to mitigate the uncontrolled release of LNG from the tank in the event of a pipe rupture. In this regard, a frangible pipe closure coupling mechanism is configured to shut down or close off LNG release in the event of a catastrophic accident that fractures of ruptures pipe attached to the tank. The closure coupling mechanism is configured to be coupled to the pipe at the tank nozzle for plumbing appurtenances. In an embodiment, the storage tank is part of a tender rail car although this embodiment is just an example. In addition, the fluid in the tank is described herein as being liquid natural gas (LNG.) However, it should be appreciated that the tank may contain any fluid and that this disclosure is not limited to LNG.

Currently fire safe air operated valves are positioned on lines exiting an LNG tank on rail tenders. Such valves are designed to fail close in the event of a fire. The fail close mechanism does provide a significant level of protection. However, these devices have practical limitations such as size and air or electrical connectivity that limit the devices from placing directly at the tank interface. As a result, such devices are typically distanced a few feet from the tank nozzle. If the entire plumbing is ripped from the tank, the valve could also be removed. LNG would then discharge from the tank in an unchecked manner.

Figure 1:
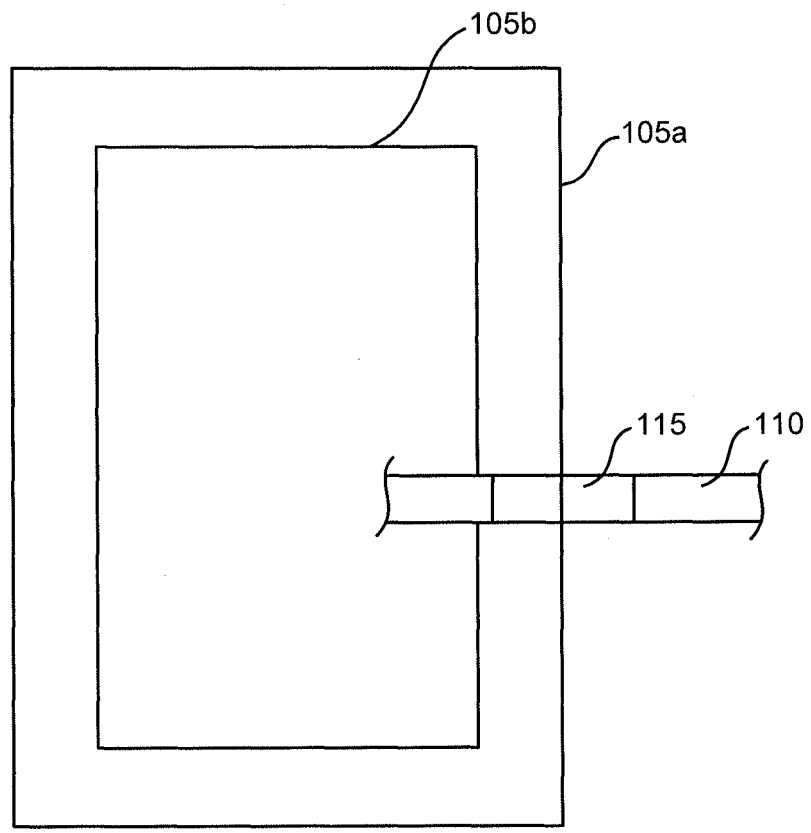
FIG. 1 shows a schematic representation of a tank that contains LNG and that has a pipe fluidly attached to the tank.

FIG. 1 shows a schematic representation of a tank 105, or vessel, that contains fluid. The tank 105 defines an enclosed chamber in which the fluid is contained. The tank 105 may include an outer jacket 105a that surrounds an inner tank 105b with a vacuum space therebetween. At least one pipe 110 or fluid conduit is attached to the tank 105 such that an internal lumen of the pipe 105 communicates with a of the inner tank 105b and provides a pathway for fluid, such as LNG, to flow into and/or out of the tank 105. The pipe 110 may be equipped with one or more valves for controlling fluid flow therethrough. A closure coupling 115 is positioned on the pipe 105 or is part of the pipe 105. As described in detail below, the closure coupling 115 is configured mitigate or eliminate the uncontrolled release of LNG from the tank 105 in the event of rupture or other breakage of the pipe 110.

Figure 2:
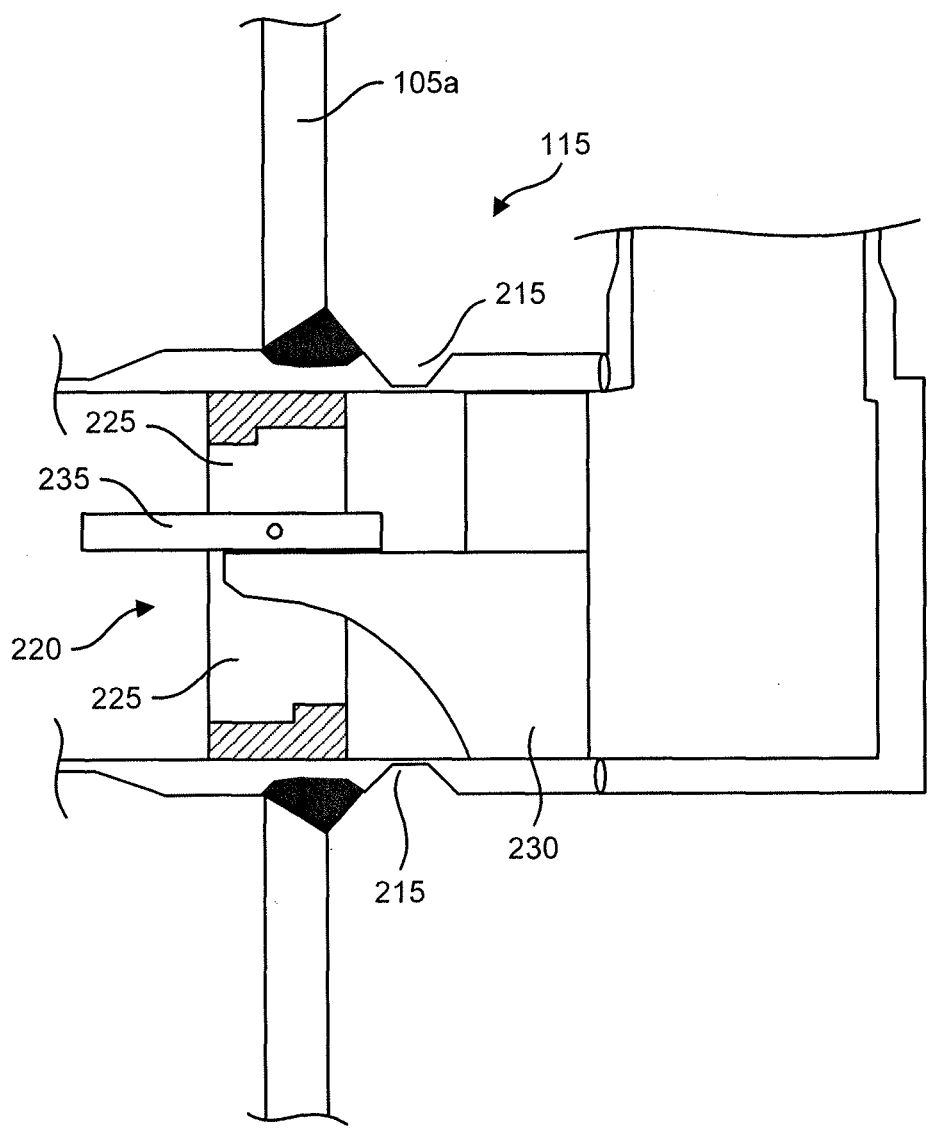
FIG. 2 shows a side view of a frangible closure coupling device in a first state for use with an LNG tank.

FIG. 2 shows a side view of a frangible closure coupling 115 that can be coupled to the pipe 110 (shown in cross section). The closure coupling 115 can be at, near, or part of a tank nozzle attached to the tank and is sealed to the tank jacket 105a with a seal member. The closure coupling 115 has one or more frangible or breakable regions 215 configured to give or split in the event of a sufficient amount of force being applied thereto, such as during a catastrophic event. The frangible regions 215 may be achieved in various manners, as described below. The device further includes a check valve 220 that shuts off or inhibits fluid flow out of the tank through the pipe 110 in the event of the frangible regions 215 breaking. An exemplary, non-limiting embodiment of the check valve 220 includes a valve housing 225 and a valve retainer 230 that collectively control a rotating seat 235, as described more fully below.

In an embodiment, the tank nozzle is a heavy nozzle that is incorporated into the tank 105 or into a jacket wall of the tank 105. Sealing portions of the closure coupling are substantially protected from being destroyed in a severe accident. The tank 105 (or jacket 105a) has a relatively smooth and cylindrical shape that provides for significantly enhanced protections from collision effects that would otherwise remove attachments that protrude from the tank or jacket wall.

Figure 3:
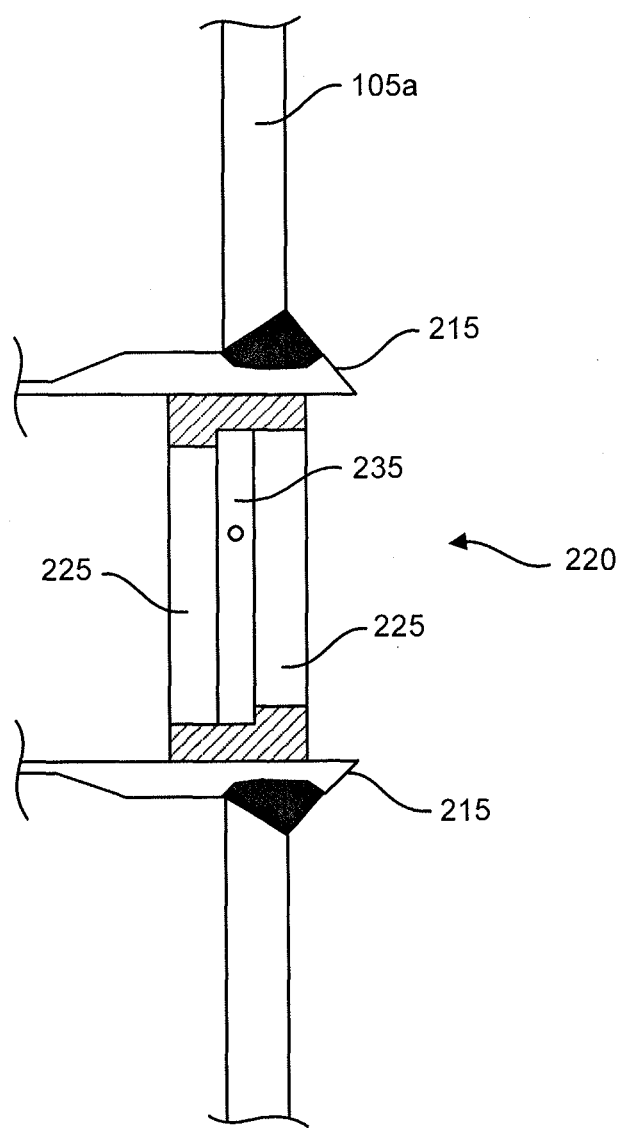
FIG. 3 shows the device in a second state.

As shown in FIG. 3, the frangible region 215 is configured to break or give in the event of the pipe 110 experiencing a predetermined level of force such as in a catastrophic event. When the frangible region 215 breaks, the valve 220 automatically closes to block or inhibit fluid flow out of the pipe 110. The area that breaks is the sealing surface to atmosphere in the un-activated position of the device. Conventional devices in the industry have bolts, pins or spring loaded retainers and the main pressure sealing surface is a range of sealing techniques using elastomers. Such seals can potentially wear or cold flow and produce leaks over time that are not the consequence of an accident. Such leaks on a root device (i.e., the first device on the outlet of a vessel or tank) can have serious consequences because there is potentially no way to isolate such a leak. The disclosed frangible pressure seal represents a much higher integrity to leaks over time. In an embodiment, the valve 220 is upstream of the frangible region 215 and the valve retainer 230 is attached to the pipe at a location downstream of the frangible region 215. Thus, the valve retainer would break away from the valve if the frangible region separates. In FIGS. 2-6, fluid flows in a direction from left to right (i.e., out of the tank) relative to the figures.

As mentioned, the frangible regions 215 may vary in configuration. In an embodiment, the frangible region 215 is a thinned region of the pipe 110. That is, the frangible region 215 of the pipe 110 thinner walled than another, adjacent section of the pipe 110. The tank 105 is heavy walled (such as on the order of .5 inch thick stainless steel) and the pipe distal (relative to the tank 105) to the frangible region is heavier walled. For example, the pipe in the frangible region 215 section may be Schedule 10, and the pipe between the frangible region and the first valve may be Schedule 40.

As a result, breakage of plumbing or pipe in the vicinity of the tank is prearranged or inclined to occur at the frangible region 215 of the pipe. The thinned section may be achieved in many ways. For example, it may be achieved by either drawing the pipe, machining the outer surface (such as in a lathe operation), or hydraulically expanding the pipe in one or more regions. Such operations may induce cold work into the pipe and thus heat treatment to increase ductility may be subsequently used.

In another embodiment, the pipe may not be thinned in the frangible region 215 but may simply be heat treated in a region such that the material of the pipe is less rigid in the frangible region than in other regions of the pipe. For example, if the schedule 40 pipe has a cold work of 10% (whereby it is not quite completely austenitic), the frangible area may be heat treated to increase its ductility.

In another embodiment, the frangible region is achieved by welding the pipe in the intended region to make the pipe more likely to break at the weld zone.

In another embodiment, an outer jacket of material may be placed over the pipe distal to or adjacent to the frangible region 215. This would make the jacketed region stronger such that the unjacketed region is frangible relative to the jacketed region. Note that the frangibility of the frangible region 215 can be tailored by not only the relative thicknesses of the sections by also by the abruptness in the change in thickness. A sharp cut into the pipe wall is more susceptible to being broken than a tapered change in thickness.

As mentioned and shown in FIGS. 2 and 3, the device includes a valve 220 such as a rotating seat valve in a housing 225. This may be, for example, a multi-piece component that normally closes with flow exiting the tank through the pipe. The valve may be welded or otherwise attached to the interior of the pipe 110 at the proximal side of the frangible region 215, as shown in FIG. 2. The valve 220 includes the rotating seat 235, which is supported by a valve retainer 230. The valve retainer 235 maintains the rotating seat 235 in a default open orientation such that fluid flow can occur through the pipe 110. When the frangible region 215 breaks, the valve retainer 230 falls out of the valve so that it no longer supports the rotating seat 235 in the open state and the rotating seat, because of the eccentric position of a pivot to which it is attached, automatically transitions or moves to a closed state as shown in FIG. 3.

Rather than orient the valve to enable flow to exit the tank, the valve flow direction ensures closure of the valve for flow exiting the tank. The intent is to keep the valve at the tank in a closed position in the event of a break of the frangible connection. Note that the valve may not be a gas tight connection. Merely inhibiting liquid ejection from the tank in a catastrophic accident is deemed valuable. Furthermore, if the relief valves are disabled in the accident, (e.g. stuck in the dirt), then a non-sealed check valve would be desirable.

As shown in FIG. 2, the valve retainer 230 may be a one piece or multi-piece component that is welded into the interior of the pipe 110 at the distal side of the frangible region 215. As mentioned, the valve retainer 230 maintains the rotating seat 235 in an open condition while the frangible region 215 and distal pipe 110 are intact. Separation or breakage of the frangible region removes the valve retainer from the valve and enables or initiates closure of the valve, as shown in FIG. 3.

Figure 4:
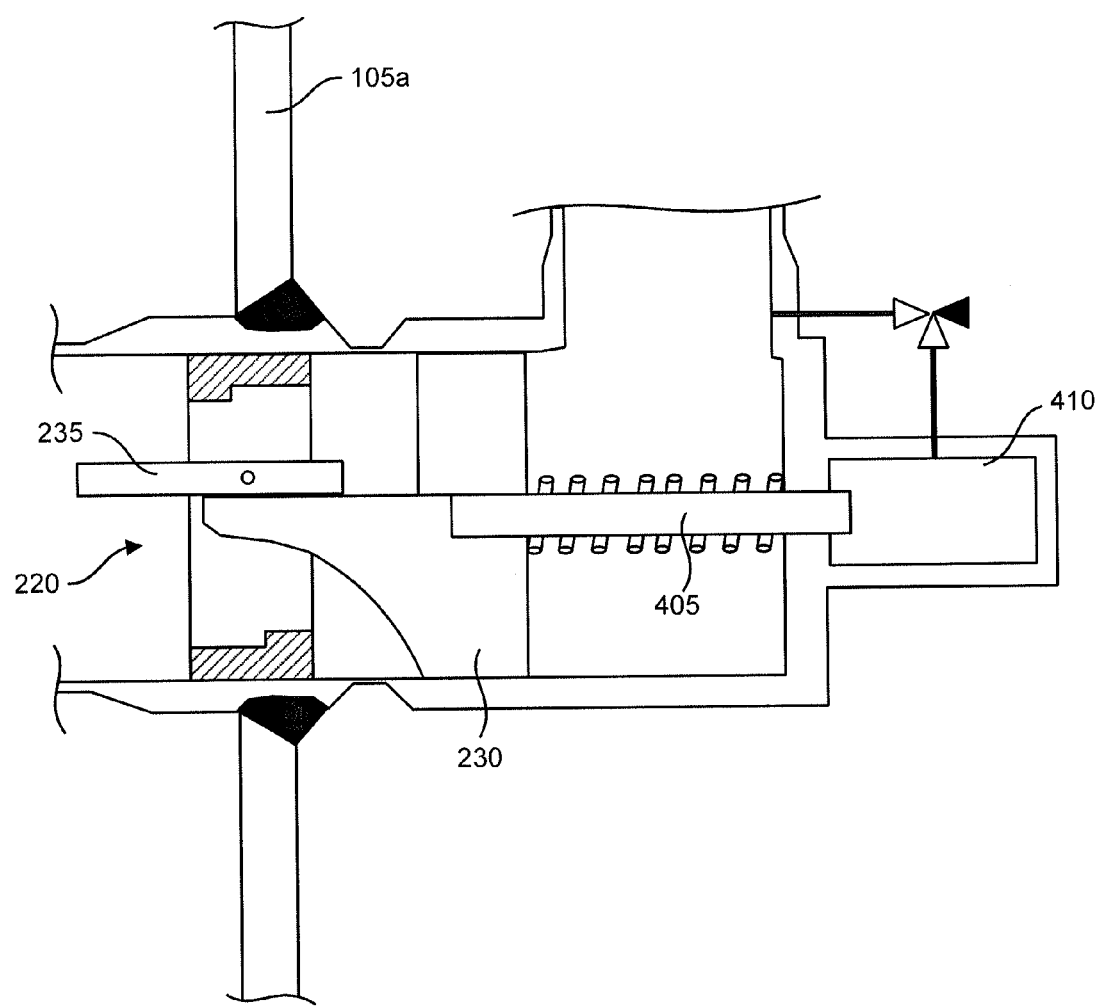
FIGS. 4-6 shows alternate embodiments of a frangible closure coupling device.
Figure 5:
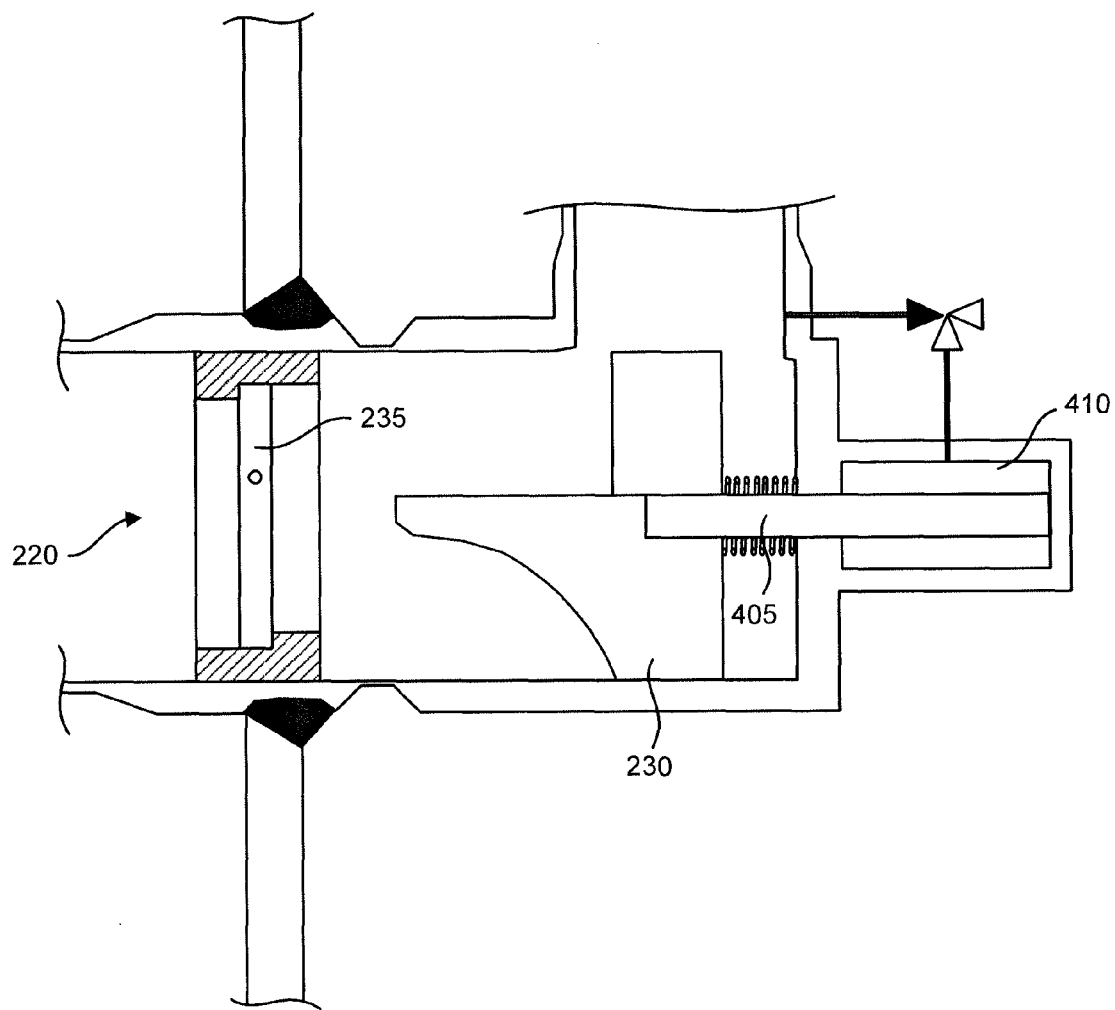
Figure 6:
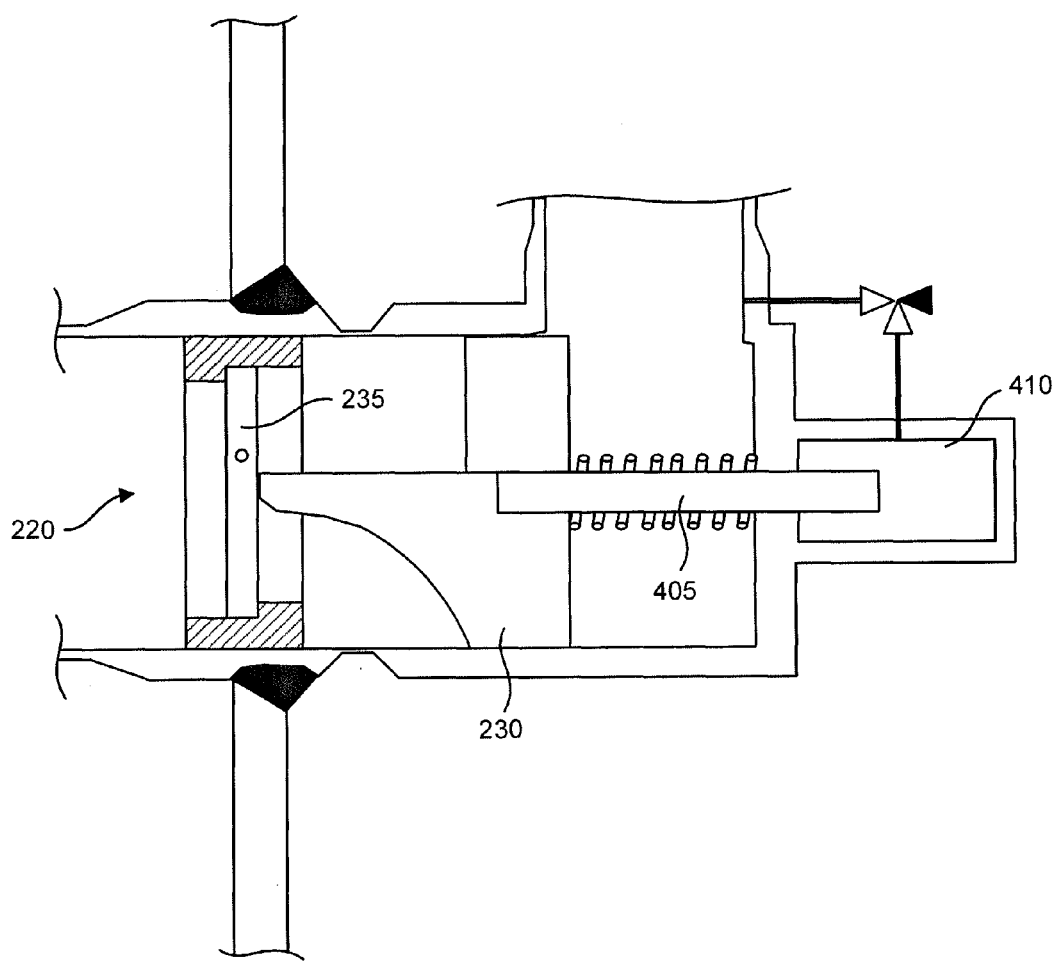

FIG. 4 shows another embodiment of a frangible closure coupling 115 wherein this embodiment includes an actuator assembly or system that can be remotely actuated to close the valve 220. A spring 405 or other biased member is positioned inside the pipe such that it maintains the valve retainer 230 in a state that keeps the valve 220 open. The spring 405 communicates with a closed chamber 410 and a pilot, which can be locally or remotely located relative to the tank. A locally located device would be attached to the pipe 110 near the tank. In the state shown in FIG. 4, the spring 405 maintains the valve in the open state. As shown in FIG. 5, the spring 405 can retract when actuated such that it moves or otherwise actuates the valve retainer 230 to cause the valve 220 to close and block flow out of the tank. The spring 405 can be caused to retract such as when the chamber 410 is vented so that the pressure in the pipe overcomes the internal spring 405. As shown in FIG. 6, the spring 405 can return to the expanded state to support the valve 220 in the closed state.

It should be appreciated that other mechanisms can be used to actuate the valve 220 into a closed state. For example, a linear actuator such as an air actuator can be coupled to the valve 220 for manually or automatically closing the valve upon actuation. The actuator may have a stem attached to the valve retainer 230 for moving the valve retainer and closing the valve 220 upon actuation.

The device will advantageously not close except under catastrophic conditions, such as where the plumbing is severed from the tank.

Although embodiments of various methods and devices are described herein in detail with reference to certain versions, it should be appreciated that other versions, embodiments, methods of use, and combinations thereof are also possible. Therefore the spirit and scope of the appended claims should not be limited to the description of the embodiments contained herein.

The invention claimed is:

1. A fluid flow closure device for a liquid natural tank, comprising:
   a fluid conduit attachable to an outlet nozzle of a liquid natural gas tank, the fluid conduit having a breakable region that is inclined to break upon application of a predetermined amount of force to the fluid conduit;
   a valve assembly entirely inside the fluid conduit, the valve assembly configured to transition between an open state that permits fluid flow in a distal direction and a closed state that inhibits fluid flow in a distal direction through the fluid conduit, and wherein the valve assembly comprises:
      a valve retainer attached to the inside wall of the fluid conduit on a first side of the breakable region, the valve retainer having a support surface that extends from the first side of the breakable region to a second side of the breakable region;
      a flap positioned on a second and opposite side of the breakable region entirely inside the fluid conduit, wherein the flap rotates about an eccentric pivot point along the flap, wherein the support surface of the valve retainer supports the flap in a horizontal position when the valve retainer is in a first state, and wherein the valve retainer moves away from the flap to a second state where the valve retainer no longer supports the flap in the horizontal position such that the flap rotates to a non-horizontal position and occludes the fluid conduit when the valve retainer is in the second state;
   an actuator assembly that causes the valve retainer to transition from the first state to the second state, wherein the actuator assembly is a linear air actuator.

2. A device as in claim 1, wherein the actuator assembly includes a spring that maintains the valve assembly in the open state until the actuator assembly is actuated.

3. A device as in claim 2, wherein the spring is coupled to a piloted chamber.

4. A device as in claim 3, wherein venting of the piloted chamber causes the actuation of the actuator assembly.

5. A device as in claim 1, wherein the actuator assembly is remotely located relative to the valve assembly.

6. A device as in claim 1, wherein the actuator assembly is locally located relative to the valve assembly.

7. A fluid flow closure device for a liquid natural tank, comprising:
   a fluid conduit attachable to an outlet nozzle of a liquid natural gas tank, the fluid conduit having a breakable region that is inclined to break upon application of a predetermined amount of force to the fluid conduit;
   a valve assembly entirely inside the fluid conduit, the valve assembly configured to transition between an open state that permits fluid flow in a distal direction and a closed state that inhibits fluid flow in a distal direction through the fluid conduit, and wherein the valve assembly comprises:
      a valve retainer attached to the inside wall of the fluid conduit on a first side of the breakable region, the valve retainer having a support surface that extends from the first side of the breakable region to a second side of the breakable region;
      a flap positioned on a second and opposite side of the breakable region entirely inside the fluid conduit, wherein the flap rotates about an eccentric pivot point along the flap, wherein the support surface of the valve retainer supports the flap in a horizontal position when the valve retainer is in a first state, and wherein the valve retainer moves away from the flap to a second state where the valve retainer no longer supports the flap in the horizontal position such that the flap rotates to a non-horizontal position and occludes the fluid conduit when the valve retainer is in the second state;
   an actuator assembly that causes the valve retainer to transition from the first state to the second state, wherein the actuator assembly includes a spring that maintains the valve assembly in the open state until the actuator assembly is actuated and wherein the spring is coupled to a piloted chamber.

8. A device as in claim 7, wherein venting of the piloted chamber causes the actuation of the actuator assembly.

9. A device as in claim 7, wherein the actuator assembly is remotely located relative to the valve assembly.

10. A device as in claim 7, wherein the actuator assembly is locally located relative to the valve assembly.

* * * * *